US006729670B1

(12) United States Patent  
Buls et al.

(10) Patent No.: US 6,729,670 B1
(45) Date of Patent: May 4, 2004

(54) LINKAGE FOR EXPANDABLE ROOMS

(75) Inventors: Vincent Buls, Wilton, IA (US); Paul Edmund Hanser, Tipton, IA (US)

(73) Assignee: HWH Corporation, Moscow, IA (US)

( * ) Notice: Subject to any disclaimer, the term of this patent is extended or adjusted under 35 U.S.C. 154(b) by 33 days.

(21) Appl. No.: 10/065,509

(22) Filed: Oct. 25, 2002

(51) Int. Cl.$^7$ .................................................. B60P 3/34
(52) U.S. Cl. .................................... 296/26.13; 296/176
(58) Field of Search .................. 296/26.13, 26.12, 296/26.01, 164, 165, 168, 171, 172, 173, 175, 176, 26.14, 26.15

(56) References Cited

U.S. PATENT DOCUMENTS

| 3,582,130 | A |   | 6/1971 | Borskey |   |
|---|---|---|---|---|---|
| 3,619,001 | A |   | 11/1971 | Borskey |   |
| 3,924,889 | A |   | 12/1975 | Gogush |   |
| 4,197,600 | A | * | 4/1980 | Slabic | 296/175 |
| 4,981,319 | A |   | 1/1991 | Gerzeny et al. |   |
| 5,078,441 | A |   | 1/1992 | Borskey |   |
| 5,366,266 | A |   | 11/1994 | Harbison |   |
| 5,560,667 | A | * | 10/1996 | Edry | 296/175 |
| 5,570,924 | A | * | 11/1996 | Few et al. | 296/175 |
| 5,586,802 | A | * | 12/1996 | Dewald, Jr. et al. | 296/171 |
| 5,785,373 | A | * | 7/1998 | Futrell et al. | 296/26.01 |
| 5,857,733 | A |   | 1/1999 | Dewald, Jr. et al. |   |
| 5,860,686 | A | * | 1/1999 | Tiedge | 296/175 |
| 5,908,215 | A | * | 6/1999 | Hanser et al. | 296/26.12 |
| 5,971,471 | A | * | 10/1999 | Gardner | 296/165 |
| 6,152,520 | A |   | 11/2000 | Gardner |   |
| 6,325,437 | B2 |   | 12/2001 | Hiebert |   |
| 6,536,821 | B1 | * | 3/2003 | Gardner | 296/26.01 |
| 6,568,734 | B2 | * | 5/2003 | Buls et al. | 296/26.12 |

* cited by examiner

Primary Examiner—D. Glenn Dayoan
Assistant Examiner—H. Gutman
(74) Attorney, Agent, or Firm—James C. Nemmers

(57) ABSTRACT

A linkage assembly for expandable rooms for recreational vehicles to affect the coordinated movement of parallelogram linkage members through the actuation of a glide arm that will extend or retract the expandable room. The glide arm is powered by a hydraulic cylinder and moves generally vertically along a vehicle frame member as the hydraulic cylinder rod extends or retracts to move the expandable room relative to the vehicle frame. The glide arm is pivotally connected to one link in each of two pairs of parallelogram linkage members, the linkage members extending between points of pivotal attachment with a second structural member, such as an expandable room member, and the vehicle frame member.

6 Claims, 6 Drawing Sheets

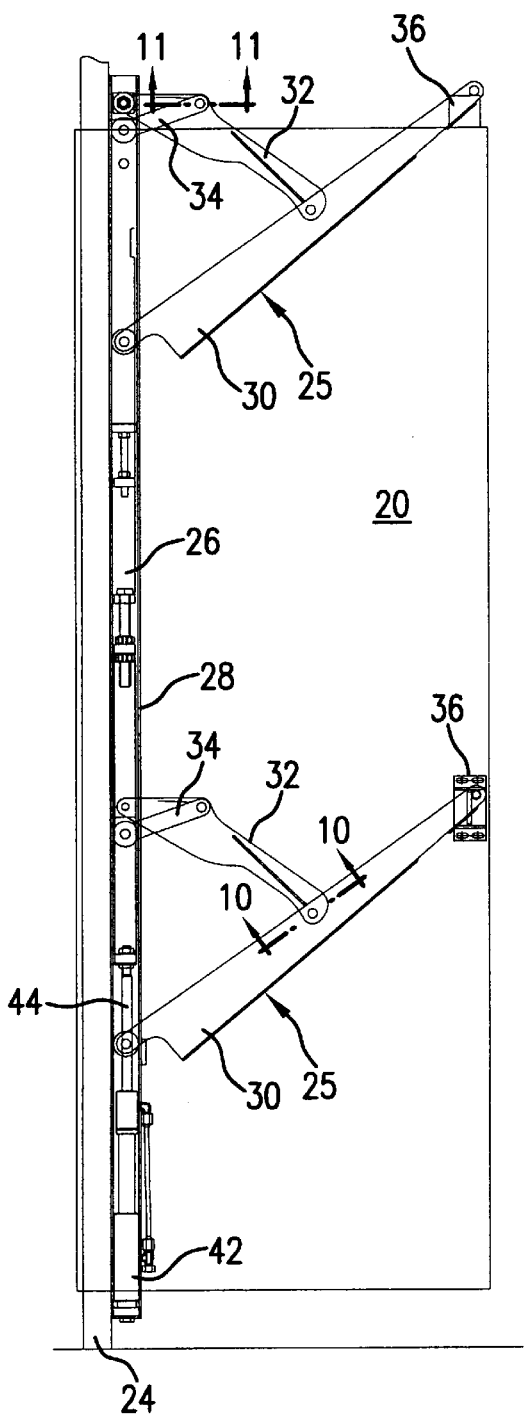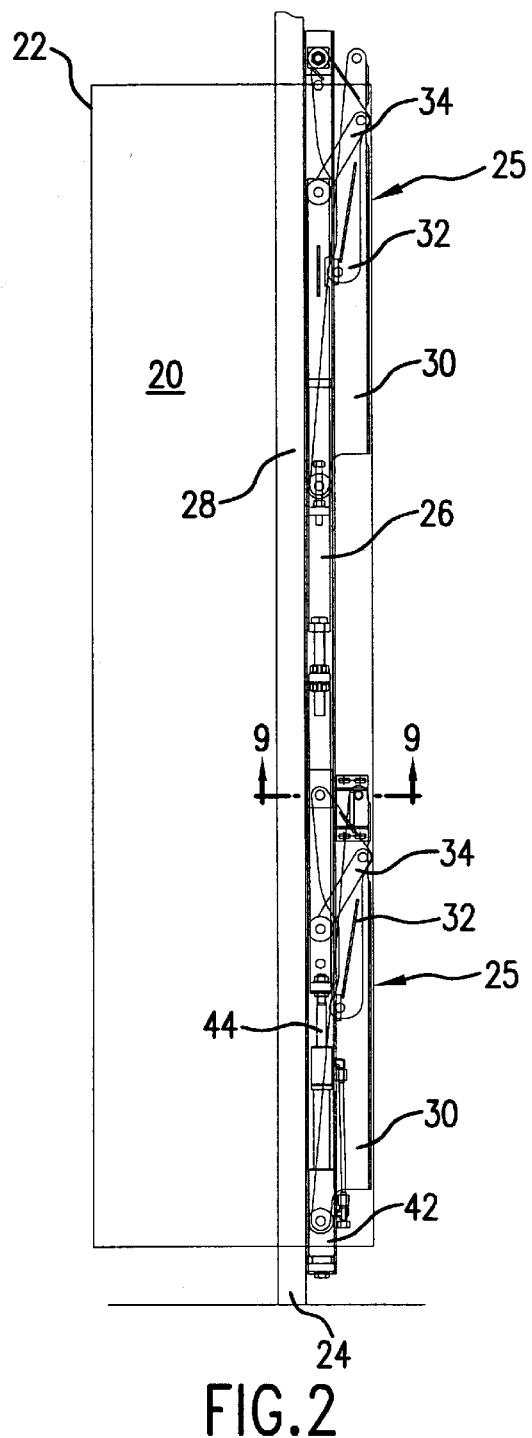

LINKAGE FOR EXPANDABLE ROOMS

BACKGROUND OF INVENTION

The invention relates to a linkage arrangement for moving members together or apart in a substantially linear motion without a substantial shift in a direction perpendicular to the desired linear motion. Typical linkages that are commonly used for a variety of purposes involve a pair of parallel members attached pivotally to a pair of parallel linkage members to form a parallelogram. If one of the parallel members is fixed, then motion of the parallelogram linkage results in an angular motion—in or out and up or down rather than simply in or out. The present invention relates to a generally straight motion parallelogram linkage.

The invention disclosed herein is particularly useful as a control mechanism for expandable rooms in habitable structures, especially room structures that are telescopically slideable between retracted and extended positions for motorized or towed vehicles. A variety of recreational vehicles are known and used that have a room or a room portion that may be moved from a retracted position while the vehicle is moving over the road to an extended position when the vehicle is stationary in order to provide additional internal space. This type of an arrangement provides adequate space to accommodate users when a recreational vehicle is parked for habitation while still keeping the vehicle within governmental regulations that impose width limitations for vehicles on roads and highways. When these vehicles are stationary, they are frequently used for habitation for extended periods of time, and when so used, it is highly desirable to be able to maximize the available living space. This is done in a variety of ways in which the user can move a "nested" portion of the expandable room out to its extended or expanded position, typically under hydraulic or electrical power.

These expandable room portions usually comprise a structure that includes a floor, a roof, an external end wall (typically generally parallel to the vehicle side wall), an open (or openable), interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall. A large factor in the purchase of a vehicle of this type is the amount of useable space that is available inside the vehicle. Thus, it is desirable that the mechanism for extending and retracting the room take up a minimum of space.

The prior art for expanding and retracting expandable rooms generally employs hydraulic arms that are housed inside the vehicle or under the floor of the vehicle. The hydraulic arms contained within the vehicle require a housing unit when they are in their retracted position. This housing unit remains intact when the room is extended taking up space within the vehicle. The hydraulic arms that are housed under the floor are generally complex, relatively expensive, and may be unduly heavy. Further, when the room is in the retracted position, otherwise available storage space under the floor is lost. The additional weight also adversely affects the fuel economy of the vehicle. With the highly competitive market in these recreational vehicles, not only weight and space but also cost and reliability of operation are important factors.

An example of an improved type of linkage utilized in these expandable rooms is disclosed in co-pending patent application Ser. No. 09/682,874 filed Oct. 26, 2001 and entitled "Straight Motion Parallelogram Linkage", now U.S. Pat. No. 6,568,734. It is the object of this invention to provide an improved linkage mechanism for expandable rooms for vehicles which mechanism is relatively inexpensive to manufacture, reliable in use, lightweight, and which will allow for maximum space inside the vehicle. It is a further object to provide a braced parallelogram linkage that permits motion of linkage members together or away from one another in a substantially linear path without substantial movement of the members in a direction perpendicular to said path. It is a further object to provide a mechanism for the expansion and retraction of expandable rooms or structures when the rooms or structures are not disposed for convenient housing of the mechanism in the floor. Finally, it is an object of the present invention to provide such a parallelogram linkage mechanism wherein a force assist means such as, for example, a hydraulic cylinder, electric drive, or pneumatic control system may drive the movement of the braced parallelogram linkage, and where the linkage mechanisms are provided on both sides of the room, they are synchronized.

SUMMARY OF INVENTION

The present invention includes a linkage assembly that can be manually operated or powered by a hydraulic cylinder, electric drive or pneumatic or other similar control system, to affect the coordinated movement of parallelogram linkage members through the actuation of a glide arm or rolling support arm. The glide arm moves generally vertically along a first structural member, such as a vehicle frame member, as the hydraulic cylinder extends or retracts to move the expandable room relative to the vehicle frame. The glide arm is pivotally connected to one link in each of two pairs of parallelogram linkage members, the linkage members extending between points of pivotal attachment with a second structural member, such as an expandable room member, and the vehicle frame member. The glide arm is constructed to accommodate movement of the glide arm past the ends of the linkage members that are operatively attached to the vehicle frame member.

Thus, each pair of linkage assemblies comprises a main link attached at one end to rollers that move within a vehicle frame member and at the other end to the expandable room member. A first linkage member is pivotally attached at one end to the vehicle frame member and at the other end to the main link midway between its ends. A second linkage member in turn is pivotally attached to the first linkage member and at its other end is pivotally attached to and moveable with the glide arm. This double linkage arrangement improves the mechanical advantage in moving the expandable room inwardly and outwardly. Movement of the glide arm causes the main link and the first linkage member to move and pivot thus extending or retracting the room. During extension and retraction of the room, the linkage assemblies create an improved mechanical advantage in extending and retracting the room. Preferably, a pair of upper and lower linkage assemblies is employed on each side of the expandable room, and a torsion bar interconnects the linkage assemblies to equalize the pressures on the assemblies and thereby assure smooth, synchronized operation.

BRIEF DESCRIPTION OF DRAWINGS

FIG. 1 is an interior side view of an expandable room and showing the linkage mechanisms when the room is retracted and the linkage mechanisms are extended;

FIG. 2 is an interior side view similar to FIG. 1 but showing the expandable room extended and the linkage mechanisms retracted;

DETAILED DESCRIPTION

Figure 3:
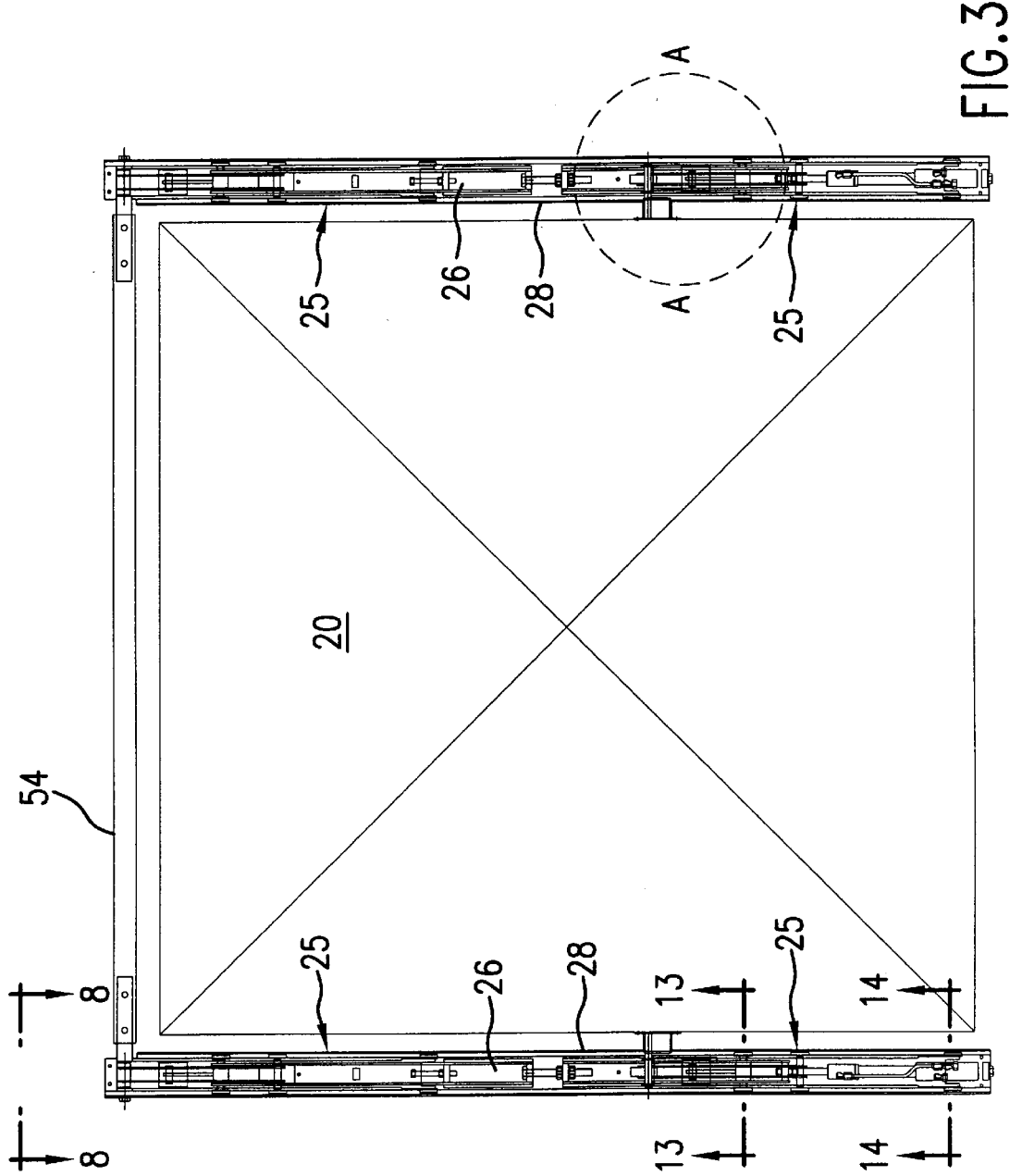
FIG. 3 is an end view showing the linkage mechanism on both sides of the expandable room.
Figure 4:
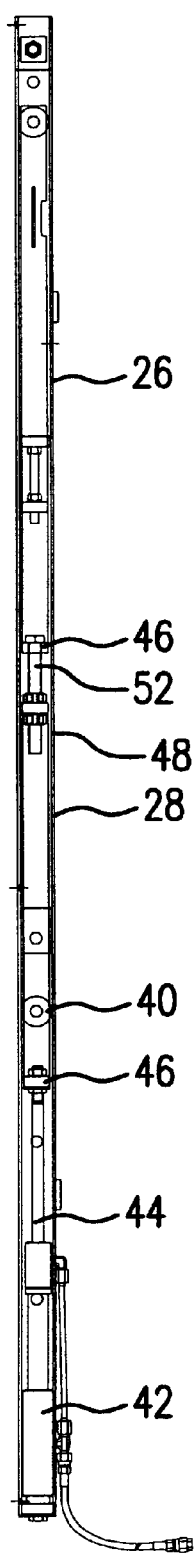
FIG. 4 is a side elevation view of a portion of the mechanism and showing a vehicle frame and glide arm when the linkage mechanism is extended and the room retracted.
Figure 5:
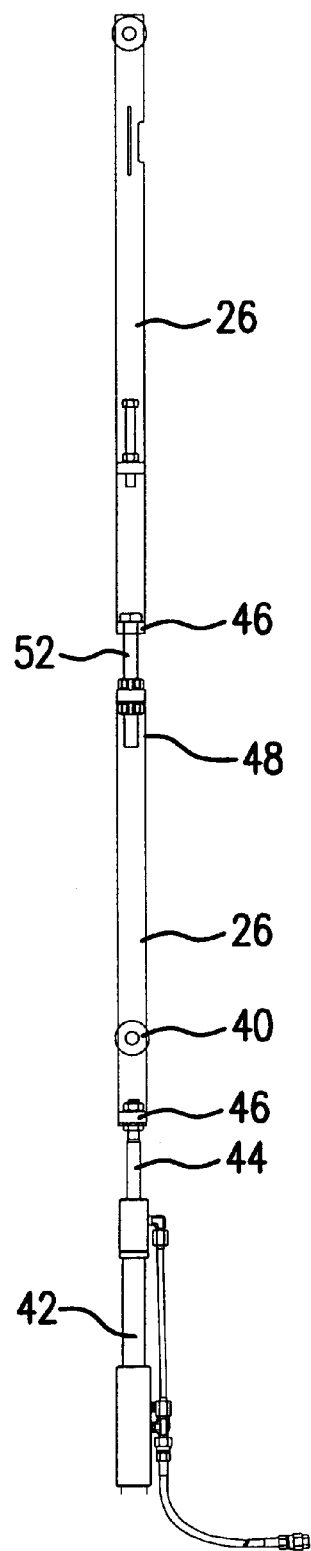
FIG. 5 is a side elevation view similar to FIG. 4 and showing only the glide arm mechanism.
Figure 6:
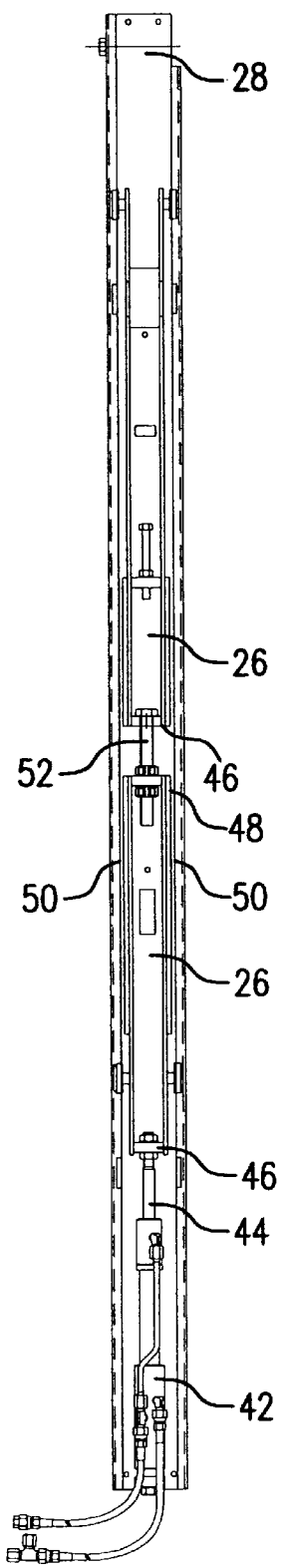
FIG. 6 is a front elevation view of that portion of the mechanism shown in FIG. 4 and thus showing a vehicle frame and glide arm when the linkage mechanism is retracted and the room extended.
Figure 7:
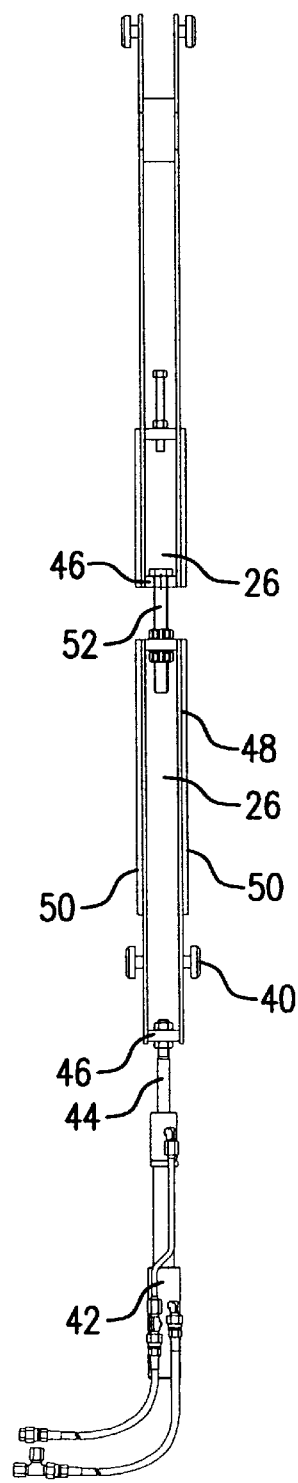
FIG. 7 is a front elevation view similar to FIG. 6 and showing only the glide arm mechanism.

Referring first to FIGS. 1, 2 and 3, there is illustrated an expandable room for a recreational vehicle, for example, which has an opening formed in its side wall to accommodate an expandable room indicated generally by the reference numeral 20. An example of an expandable room for a recreational vehicle is shown in U.S. Pat. No. 6,067,756. Such expandable rooms of various sizes are well know to those skilled in the art and therefore additional details of the vehicle and room will not be, described. FIG. 2 shows the expandable room 20 in its extended position to provide additional living or storage space inside the recreational vehicle when the vehicle is stationary, such as at a campsite. As is well known to those skilled in the art, when the vehicle is traveling over the road, the expandable room 20 is retracted as shown in FIG. 1 so that the end wall 22 of the expandable room 20 is generally flush with an exterior wall 24 of the recreational vehicle. As is also well known to those skilled in the art, the expandable room 20 typically extends from the side of the recreational vehicle.

FIGS. 1 and 2 show the linkage assemblies, each indicated by the reference. numeral 25, for extending and retracting the expandable room 20. As shown in FIG. 3, there is a pair of assemblies 25 on each side of the room 20, an upper assembly and a lower assembly, but it should be understood that in some applications, it may be necessary to use only a single assembly 25 on each side. Since the assemblies 25 are substantially identical and function is the same manner, only one of the assemblies 25 will be described in detail and will be described as used in connection with an expandable room for a recreational vehicle. It will be understood, however, that these assemblies can be used in other application where it is desired repeatedly to move and retract a large object along a limited linear distance.

Figure 8:
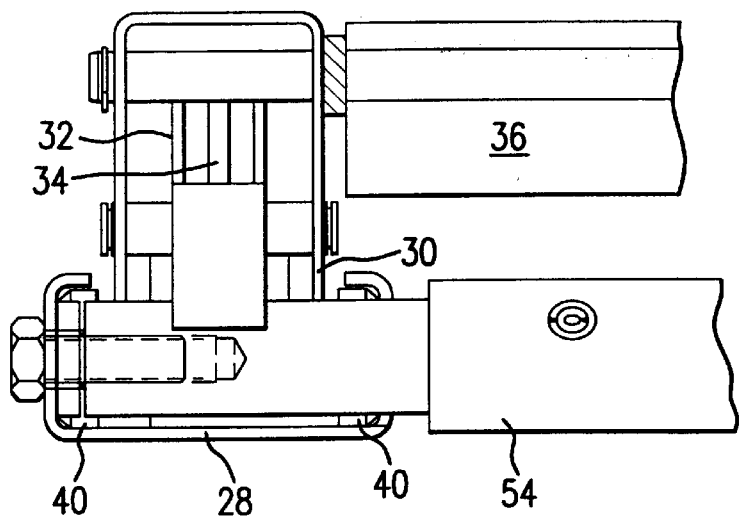
FIG. 8 is a top view looking in the direction of the arrows 8—8 of FIG. 3 and showing the pivotal connection of the vehicle frame member and the second linkage member and showing the torsion bar connection.
Figure 9:
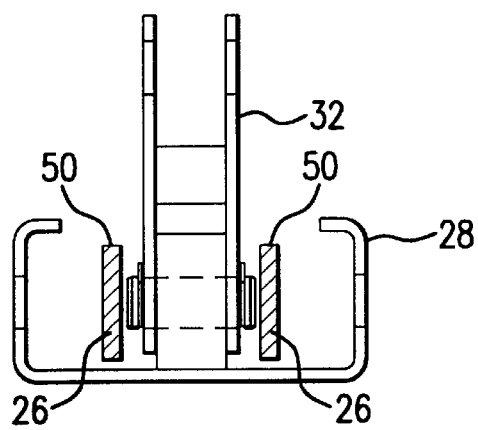
FIG. 9 is a cross-sectional view taken on the line 9—9 of FIG. 3 and showing the pivotal connection of the first linkage member to the vehicle frame member.
Figure 10:
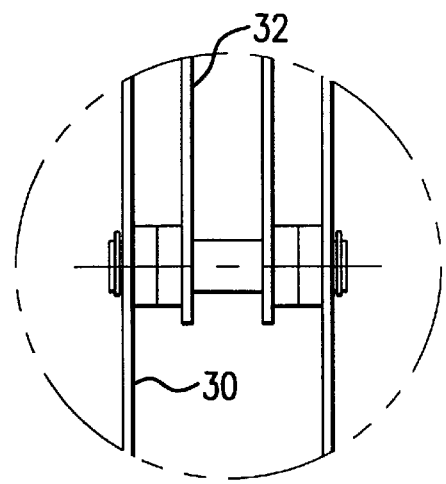
FIG. 10 is a cross-sectional view taken on the line 10—10 of FIG. 1 and showing the pivotal connection of main link and the first linkage member.
Figure 11:
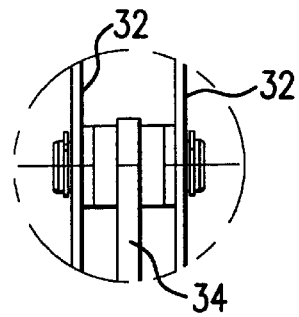
FIG. 11 is a cross-sectional view taken on the line 11—11 of FIG. 1 and showing the pivotal connection of the first and second linkage members.
Figure 12:
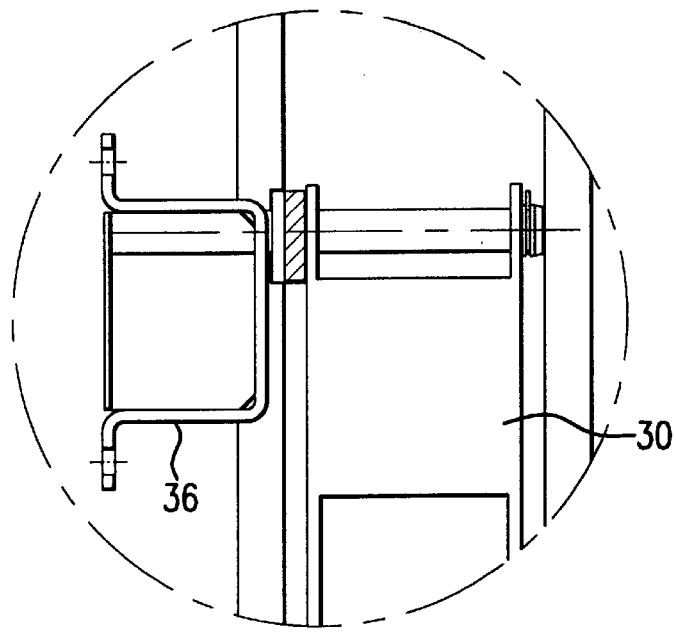
FIG. 12 is an enlarged view of detail A—A of FIG. 3 and showing the pivotal connection of the first linkage member and the vehicle frame.
Figure 13:
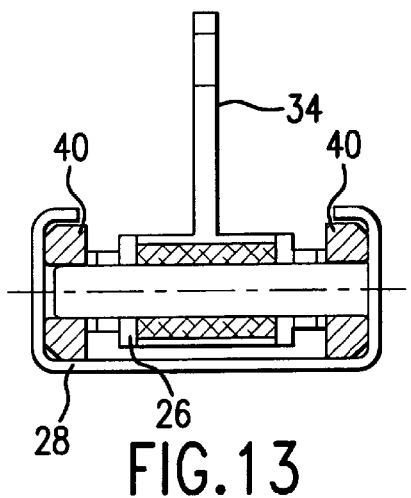
FIG. 13 is a cross-sectional view taken on the line 13—13 of FIG. 3 and showing the pivotal connection of the second linkage member and the glide arm.
Figure 14:
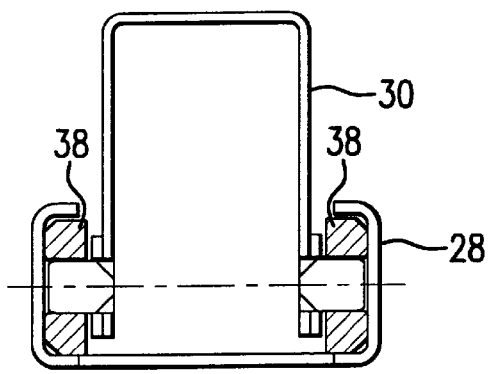
FIG. 14 is a cross-sectional view taken on the line 14—14 of FIG. 3 and showing the pivotal and rolling connection of the main link and the channel.

FIG. 1 shows the linkage assembly 25 in the extended position with the room 20 retracted while FIG. 2 shows the linkage assembly 25 in the retracted position with the room 20 extended. The linkage assembly 25 includes a glide arm 26 that is housed within and slidable along a frame member 28 which forms a part of the exterior wall 24 of the recreational vehicle. As best seen in FIGS. 8 and 9, frame member 28 is a standard structural channel member and therefore is open along one side. The linkage assembly 25 also includes a main link 30 and first and second linkage members 32 and 34. The main link 30 has one end pivotally connected to a mounting bracket 36 that is secured to the frame structure of the expandable room 20 at a point inwardly from the end wall 22. The other end of the main link 30 is pivotally connected to rollers 38 that roll inside the channel frame member 28 of the vehicle as the link 30 pivots. This connection is shown in detail in FIG. 14. As shown in FIG. 10, the first linkage member 32 has one end pivotally connected to the main link 30 at the center of the link 30, while the other end of the first linkage member 32 is pivotally connected to the channel frame member 28 of the vehicle (FIG. 9). The second linkage member 34 has one end connected to the first linkage member 32 (see FIG. 11) while the other end of the second linkage member 34 is pivotally connected to the glide arm 26 which rides on rollers 40 within the channel frame member 28 as illustrated in FIG. 13. Thus, as glide arm 26 moves up and down, the second linkage member 34 will move with the glide arm 26, riding on the rollers 40 which roll inside the channel frame member 28 of the vehicle. As the second linkage member 34 is moved upwardly and downwardly with the glide arm 26, it will cause the first linkage member 32 to pivot which in turn will force the main link 30 to pivot and move the expanded room outwardly to an extended position or inwardly to a retracted position, as the case may be. As the linkage assembly 25 thus moves from its extended position of FIG. 1 to its retracted position of FIG. 2 the expandable room 20 is pushed from its retracted position within the recreational vehicle to its extended position outwardly from the exterior wall 24 of the vehicle. Similarly, when the linkage assembly 25 moves from its retracted position of FIG. 2 to its extended position of FIG. 1, the expandable room 20 is pulled from its extended position outwardly from the exterior wall 24 of the vehicle back to its retracted position within the vehicle.

In order to power movement of the linkage assemblies 25 and thus move the expandable room 20, a hydraulic cylinder 42 having an operating rod 44 is mounted at the lower end of and within the channel frame member 28 of the vehicle as shown in FIGS. 1–7. The operating rod 44 has its outer end attached to the lower end 46 of the glide arm 26. The glide arm 26 is formed of parallel spaced apart walls 50 joined together at the lower end 46 and upper end 48 thus providing a longitudinal opening between the lower end and upper end 48. This allows the glide arm 26 to move upwardly and downwardly within the channel frame member 28 of the vehicle without interference with the pivot attachment of the first linkage member 32 to the channel frame member 28. This is shown in FIG. 9. The closed lower end 46 of the glide arm 26 also provides for connection of the operating rod 44 of the hydraulic cylinder 42 to the glide arm 26.

In the preferred embodiment shown in the drawings, there are a pair of linkage assemblies 25 on each side of the expandable room 20. The single hydraulic cylinder 42 powers both the upper and lower linkage assemblies by interconnecting the glide arm 26 of each assembly 25. This is illustrated in FIGS. 1–7 which shows the upper end 48 of the glide arm 26 of the lower assembly connected to the lower end 46 of the upper assembly 25 by a connecting pin 52.

The glide arm 26 for each linkage assembly 25 is shown to be nested and slidable within the channel frame member 28. Of course, depending on glide arm 26 or frame member 28 configurations, the glide arm 26 may be disposed in any convenient arrangement to move generally along the frame member 28.

In the preferred embodiment, there are a pair of linkage assemblies 25 on each side of the expandable room 20. In order to synchronize movement of the assemblies 25 on opposite side of the room 20 and therefore maintain proper alignment of the expandable room 20 relative to the exterior wall 24 of the vehicle, there is shown in FIGS. 3 and 8 a torsion bar 54. The upper linkage assemblies 25 are connected by the torsion bar 54 which is attached at its ends to the top of each assembly 25 as shown in FIG. 8. If one side of the expandable room 20 advances ahead of the other side, the torsion bar 54 will twist and slow down the faster side to allow the slower side to catch up and thus equalize the pressure. Although the use of the torsion bar 54 is a simple way of equalizing the pressure, a synchronizing cylinder in the hydraulic system can be used for the same purpose or a synchronizing system using electronics can also be employed.

Although the preferred embodiments as described herein includes reference to a force assist element in the form of hydraulic cylinders, the present invention can also employ a manual force assist element. Without any force assist element, the room may be manually pushed or pulled using the principles of the invention. It is preferred to employ room locks to secure the room in the extended or retracted position. Of course, the linkage assemblies could be reversed with mounting of the hydraulic cylinders along the expandable room exterior side wall in which case the mechanism would push the room outwardly and pull the room inwardly. Mounting the mechanism to a vehicle frame member is preferred since this arrangement requires less space.

Having described the invention in reference to the preferred embodiments thereof, it will be understood by those skilled in the relevant art that various modifications and revisions may be made and that such modifications and revisions are intended to be within the scope of the invention as claimed below.

What is claimed is:

1. A system for horizontally moving an expandable room structure between a retracted position within a vehicle having a substantially vertical wall and an extended position protruding outwardly from said vertical vehicle wall, the system comprising:

the vehicle wall extending substantially vertically;

an expandable room having an end wall disposed generally parallel to the vehicle wall and spaced-apart side walls extending generally perpendicular to the end wall;

a glide arm moveably disposed in combination with the vehicle wall and adapted to be selectively moveable generally vertically within the vehicle wall;

a power cylinder combined with the vehicle wall and operatively connected to the glide arm for extending and retracting the glide arm generally vertically within the vehicle wall; and a linkage assembly for controlling movement of the expandable room, the linkage assembly comprising:

a main link having first and second ends and pivotally connected at its first end to the expandable room at a point inwardly from the end wall and rollably combined at its second end with the vehicle wall so as to move vertically as the main link pivots;

a first linkage member having first and second ends and pivotally connected at its first end to the main link at the center of the main link and pivotally connected at its second end to the vehicle wall; and a second linkage member having first and second ends and pivotally connected at its first end to the first linkage member intermediate the first and second ends of the first linkage member, the second linkage member also being pivotally combined at its second end with the glide arm and movable with the glide arm as the glide arm is powered by the power cylinder; whereby movement of the glide arm powered by the power cylinder causes the second linkage member to pivot and produce pivotal movement of the first linkage member and the main link to move the expandable room between the retracted and extended positions.

2. The system of claim 1 in which the power cylinder is a hydraulic cylinder.

3. A system for horizontally moving an expandable room structure between a retracted position within a vehicle having a substantially vertical wall and an extended position protruding outwardly from said vertical vehicle wall, the system comprising:

the vehicle wall extending substantially vertically;

an expandable room having an end wall disposed generally parallel to the vehicle wall and spaced-apart side walls extending generally perpendicular to the end wall;

an upper glide arm moveably disposed in combination with the vehicle wall along each side wall of the expandable room, the upper glide arm being adapted to be selectively moveable generally vertically within the vehicle wall;

a lower glide arm combined with the upper glide arm in the vehicle wall along each side wall of the expandable room, the upper and lower glide arms on each side wall of the expandable room being aligned so as to move along the same vertical line, a power cylinder combined with the vehicle wall and operatively connected to the upper and lower glide arms in each side wall of the expandable room for extending and retracting the glide arms generally vertically within the vehicle wall; and upper and lower linkage assemblies combined with the respective ones of the upper and lower glide arms in substantially the same vertical plane with each of the expandable room side walls for controlling movement of the expandable room, each upper and lower linkage assembly comprising:

a main link having first and second ends and pivotally connected at its first end to the expandable room at a point inwardly from the end wall and rollably combined at its second end with the vehicle wall so as to move vertically as the main link pivots;

a first linkage member having first and second ends and pivotally connected at its first end to the main link at the center of the main link and pivotally connected at its second end to the vehicle wall; and a second linkage member having first and second ends and pivotally connected at its first end to the first linkage member intermediate the first and second ends of the first linkage member, the second linkage member also being pivotally combined at its second end with the respective one of the upper and lower glide arms and movable with the glide arms as the glide arms are powered by the power cylinder;

the main link, first linkage member and second linkage member of the upper assembly being parallel to the respective main link, first linkage member and second linkage member of the lower assembly, whereby movement of the upper and lower glide arms powered by the power cylinder causes the second linkage members of the upper and lower linkage assemblies to pivot and produce pivotal movement of the first linkage members and the main links of the upper and lower linkage assemblies thereby to move the expandable room between the retracted and extended positions.

4. The system of claim 3 in which the upper and lower glide arms on each side wall of the expandable room are interconnected and powered by a single power cylinder on each side wall.

5. The system of claim 4 in which the upper linkage assemblies are operatively connected by a torsion bar to synchronize movement of the side walls of the expandable room and thereby maintain proper alignment of the room relative to the vehicle wall.

6. The system of claim 4 in which the power cylinder is directly connected to the lower glide arm for the lower linkage assembly, and said lower glide arm has an elongated opening formed therein to provide for pivotal connection of the first linkage member of the lower linkage assembly to the vehicle wall through the elongated opening.

* * * * *